US012165379B2

(12) United States Patent
Yang et al.

(10) Patent No.: US 12,165,379 B2
(45) Date of Patent: Dec. 10, 2024

(54) TECHNIQUES FOR USING DYNAMIC PROPOSALS IN OBJECT DETECTION

(71) Applicant: Lemon Inc., Grand Cayman (KY)

(72) Inventors: Linjie Yang, Los Angeles, CA (US); Yiming Cui, Los Angeles, CA (US); Ding Liu, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 393 days.

(21) Appl. No.: 17/581,423

(22) Filed: Jan. 21, 2022

(65) Prior Publication Data
US 2023/0237764 A1 Jul. 27, 2023

(51) Int. Cl.
| | |
|---|---|
| G06K 9/00 | (2022.01) |
| G06T 7/70 | (2017.01) |
| G06V 10/40 | (2022.01) |
| G06V 10/70 | (2022.01) |
| G06V 10/764 | (2022.01) |
| G06V 10/82 | (2022.01) |
| G06V 10/94 | (2022.01) |

(52) U.S. Cl.
CPC .............. *G06V 10/513* (2022.01); *G06T 7/70* (2017.01); *G06V 10/764* (2022.01); *G06V 10/82* (2022.01); *G06V 10/87* (2022.01); *G06V 10/94* (2022.01); *G06T 2207/20081* (2013.01); *G06T 2207/20084* (2013.01); *G06T 2207/30242* (2013.01)

(58) Field of Classification Search
None
See application file for complete search history.

(56) References Cited

U.S. PATENT DOCUMENTS

2018/0134288 A1  5/2018  Schulter et al.

OTHER PUBLICATIONS

Liu et al. ("Study of object detection based on Faster R-CNN") (Year: 2017).*
International Search Report and Written Opinion in PCT/SG2023/050027, mailed Aug. 1, 2023, 9 pages.
Sun et al., "Sparse R-CNN: End-to-End Object Detection with Learnable Proposals," ArXiv, Nov. 25, 2020, pp. 14454-14463.
Xu, Richard, "Sparse R-CNN: Towards More Efficient Object Detection Models," Medium, Nov. 30, 2021, Retrieved from the Internet <URL:https://utorontomist.medium.com/sparse-r-cnn-towards-more-efficient-object-detection-models-fb244178998f>, 21 pages.
Yan et al., "RTL3D: Real-Time LiDAR-based 3D Object Detection with Sparse CNN," IET Computer Vision, May 31, 2020, vol. 14, No. 5, pp. 224-232.

* cited by examiner

*Primary Examiner* — S J Park
(74) *Attorney, Agent, or Firm* — Astute IP Law Group

(57) ABSTRACT

Described are examples for detecting objects in an image on a device including setting, based on a condition, a number of sparse proposals to use in performing object detection in the image, performing object detection in the image based on providing the sparse proposals as input to an object detection process to infer object location and classification of one or more objects in the image, and indicating, to an application and based on an output of the object detection process, the object location and classification of the one or more objects.

20 Claims, 5 Drawing Sheets

TECHNIQUES FOR USING DYNAMIC PROPOSALS IN OBJECT DETECTION

BACKGROUND

The described aspects relate to a computer vision system, and more particularly, to use of dynamic proposals in object detection in a computer vision system.

Object detection has been provided for detecting objects in images in various applications, including security and surveillance, self-driving vehicles, face detection for personal picture albums, etc. Given an input image, object detection can localize objects and/or classify or categorize the objects using a neural network of images, such as a convolutional neural network (CNN), which may have multiple refinement layers. Many object detection algorithms use anchor boxes as a post-processing step to detect objects based on anchor sets. Such post-processing steps, however, can impact the performance and efficiency of such algorithms. As such, query-based object detection algorithms have been proposed to remove manually designed anchor boxes, where learnable proposals of object location and/or classification can be used to identify object in an image. Sparse region-based CNN (R-CNN) has also been proposed to effectively reduce the number of proposals and avoid many-to-one label assignments. QueryInst further extends Sparse R-CNN with parallel supervision on dynamic mask heads to support instance segmentation. The good performance on accuracy as well as efficiency shows that the query-based methods are a promising direction for object detection and instance segmentation. The above algorithms use a fixed number of proposals as input into the object detection algorithm. Consequently, improvements in query-based object detection techniques are desired.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a method for detecting objects in an image on a device is provided. The method includes setting, by a processor and based on a condition, a number of sparse proposals to use in performing object detection in the image, performing, by the processor, object detection in the image based on providing the sparse proposals as input to an object detection process to infer object location and classification of one or more objects in the image, and indicating, by the processor and to an application and based on an output of the object detection process, the object location and classification of the one or more objects.

In another example, an apparatus for performing object detection in an image is provided where the apparatus includes a processor and a non-transitory memory with instructions thereon. The instructions upon execution by the processor, cause the processor to set, based on a condition, a number of sparse proposals to use in performing object detection in the image, perform object detection in the image based on providing the sparse proposals as input to an object detection process to infer object location and classification of one or more objects in the image, and indicate, to an application and based on an output of the object detection process, the object location and classification of the one or more objects.

In another example, a non-transitory computer-readable recording medium storing one or more outputs of object detection in an image is provided, which is generated by a method performed by an object detecting module. The method includes setting, based on a condition, a number of sparse proposals to use in performing object detection in the image, performing object detection in the image based on providing the sparse proposals as input to an object detection process to infer object location and classification of one or more objects in the image, and indicating, to an application and based on an output of the object detection process, the object location and classification of the one or more objects.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

Figure 1:
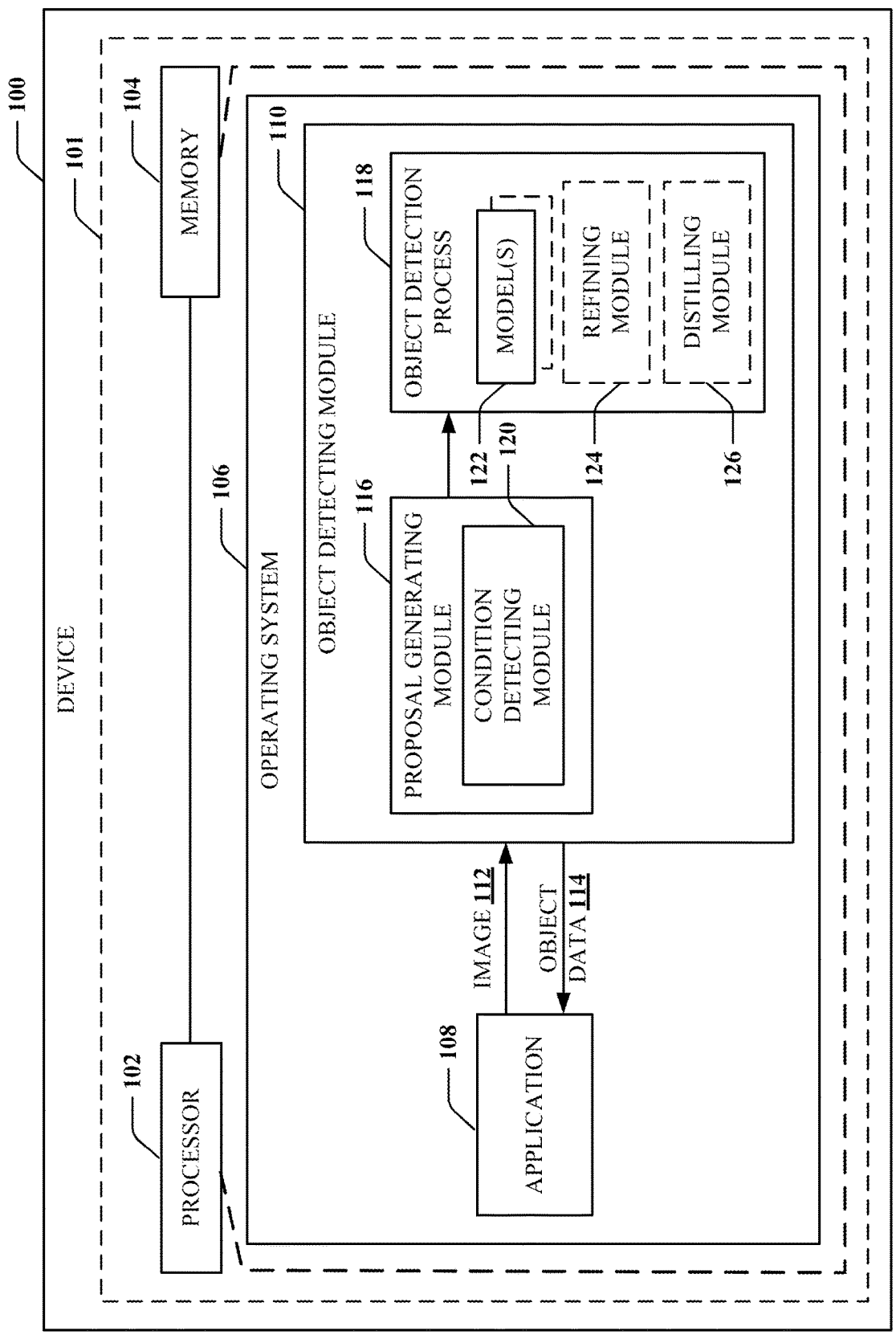
FIG. 1 is a schematic diagram of an example of a device, such as a computer vision system, for providing object detection in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to a computer vision system using a dynamic or switchable number of proposals as input to an object detection algorithm, where the number of proposals can be determined or selected based on one or more conditions. For example, current object detection algorithms, such as Sparse region-based convolutional neural network (R-CNN), QueryInst, etc., only use a fixed number of proposals and cannot be directly modified to a model with a different number of proposals other than the fixed number during the inference process. There may be certain conditions, however, where it may be desirable to use a different number of proposals. One such condition may be based on complexity of the input image. For example, for a relatively complex image, a maximum or intended number of proposals can be used, while for a relatively simple image (e.g., with a lower number of objects) a lower number of proposals can be used. Another example of a condition may correspond to resource capacity or availability of a device that is performing the object detection. For example, for a high-powered workstation with a large amount of resource capacity and/or available resources (e.g., processing and/or memory resources), a maximum or intended number of proposals can be used, while for a smaller device, such as a cellular phone, which may have a smaller amount of resource capacity and/or available resources, a lower number of proposals can be used.

Aspects described herein relate to a training strategy to facilitate a single query-based model to adaptively switch the number of proposals according to the one or more conditions. Further, a network module to dynamically choose the number of proposals based on the complexity of the input image is described, which can effectively reduce computational costs. In another aspect, an in-place distillation training process can be provided to improve a model variants with fewer proposals by transferring knowledge from, or using training from, a model with more proposals. In an aspect, the object detection algorithm or processes described herein can be plug-and-play and easily integrated with current query-based object detection algorithm for object detection and instance segmentation, as the number of proposals input to the algorithm can be changed without necessarily modifying the algorithm itself.

Accordingly, the described object detection algorithms can change based on the one or more conditions, such as the complexity of the image or capacity/availability of resources, to optimize performance of the object detection algorithms in different scenarios, rather than using a fixed number of proposals which can be inefficient on devices having processor resource constraints, e.g., portable computer devices and/or mobile phones, or can use unnecessary resources when image complexity is low.

Figure 2:
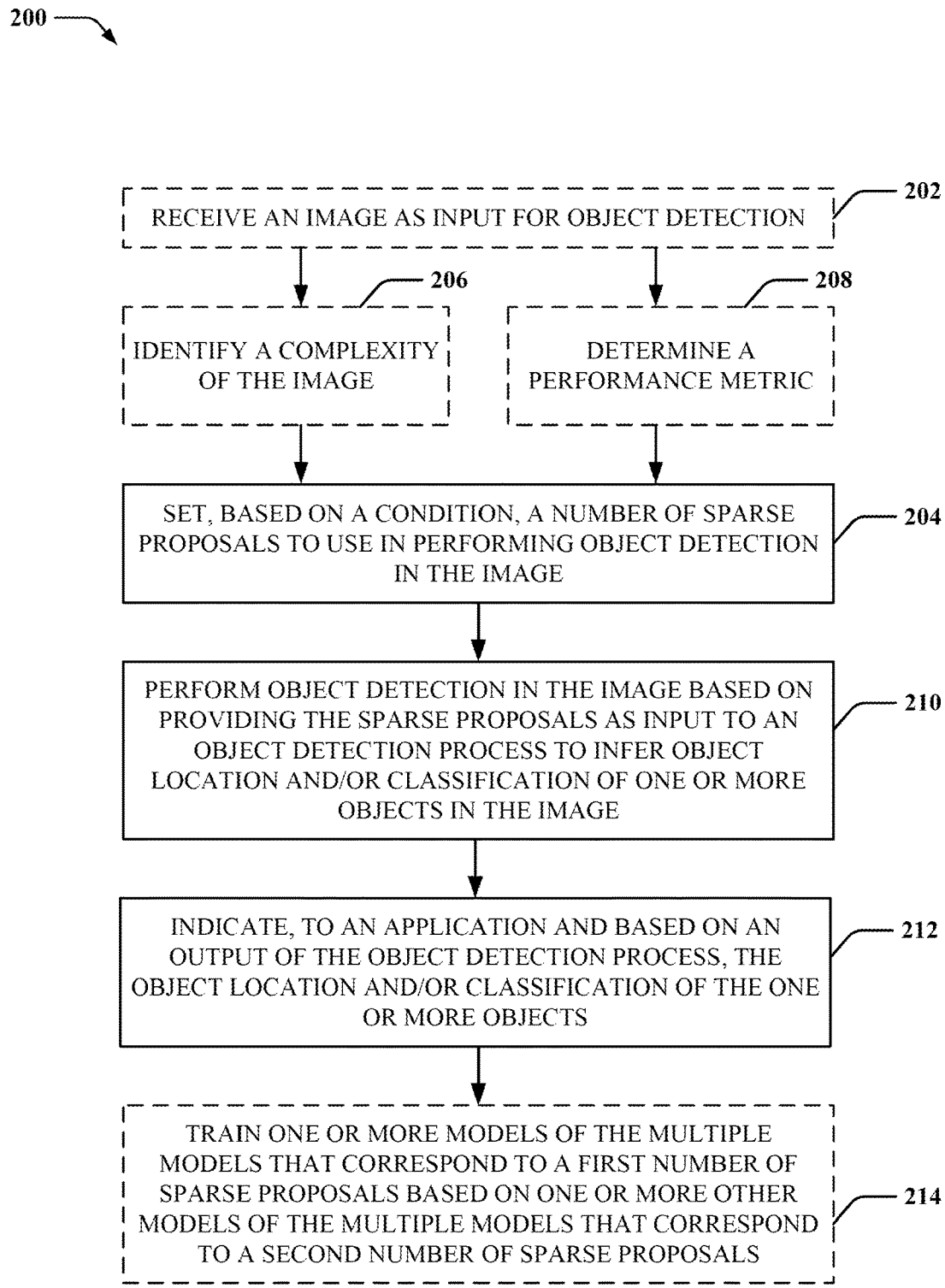
FIG. 2 is a flow diagram of an example of a method for performing object detection based on a dynamic number of sparse proposals in accordance with examples described herein.
Figure 3:
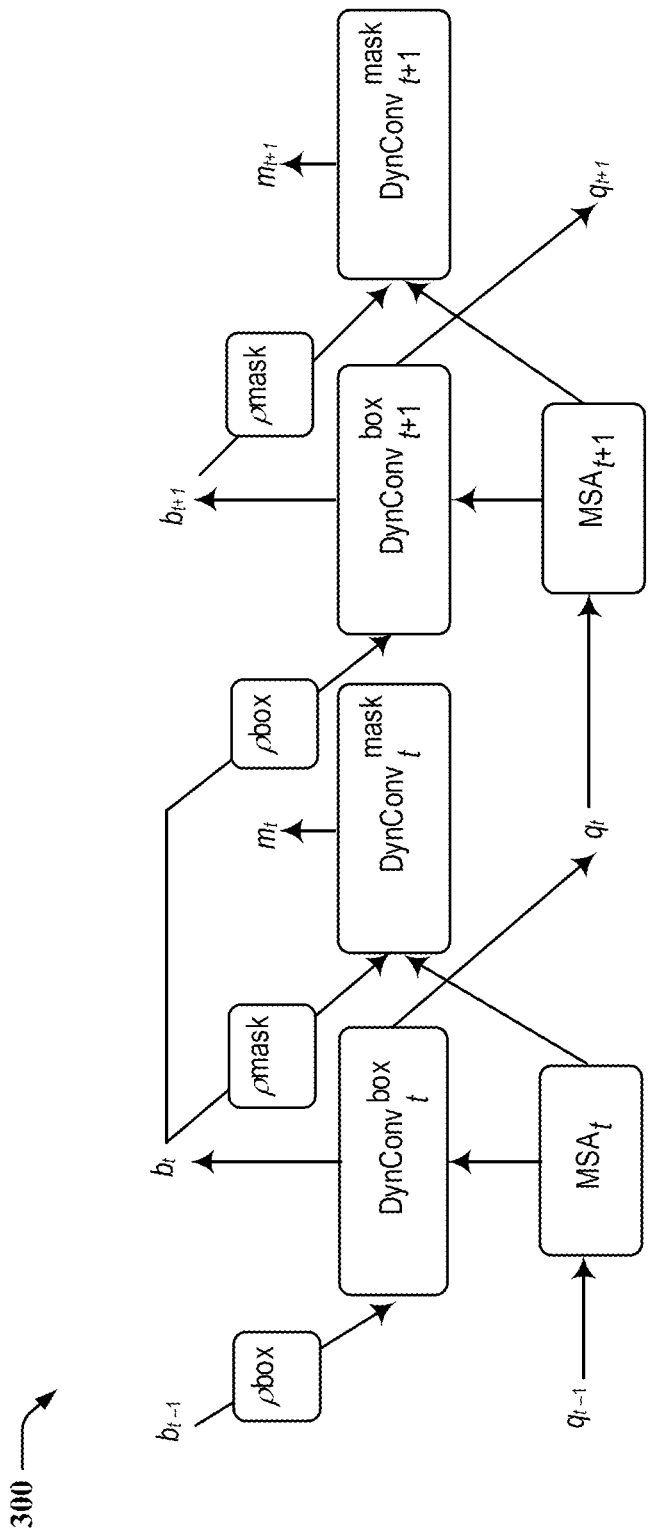
FIG. 3 is an example of model structure of multiple refinement stages for QueryInst, to which a dynamic number of sparse proposals can be provided as input in accordance with examples described herein.

Turning now to FIGS. 1-5, examples are depicted with reference to one or more components and one or more methods that may perform the actions or operations described herein, where components and/or actions/operations in dashed line may be optional. Although the operations described below in FIGS. 2 and 3 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device including a computer vision system) that can perform an object detection function for an image, which may include determining one or more of object location information or classification of an object in the image. In an example, device 100 can include a processor 102 and/or memory 104 configured to execute or store instructions or other parameters related to providing an operating system 106, which can execute one or more applications, services, etc. The one or more applications, services, etc. may include an application 108 that requests object detection, such as a security or surveillance application (e.g., to track people entering/exiting a building, granting building access to detected people, etc.), a self-driving vehicle application that can operate an vehicle and identify people, other vehicles, hazards, etc. within a driving path, a photo album application that can automatically generate photo albums for photos based on detected features of the photos (e.g., identifying specific people, pets, places, or other objects). For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component 101), and/or the like. Memory 104 may store instructions, parameters, data structures, etc., for use/execution by processor 102 to perform functions described herein.

In addition, the device 100 can include substantially any device that can have a processor 102 and memory 104, such as a computer (e.g., workstation, server, personal computer, etc.), a personal device (e.g., cellular phone, such as a smart phone, tablet, etc.), a smart device, such as a smart television, and/or the like. Moreover, in an example, various components or modules of the device 100 may be within a single device, as shown, or distributed to different devices that are communicatively coupled with one another (e.g., in a network).

In addition, device 100 can include an object detecting module 110, which can operate via operating system 106, for detecting objects in an input image, which can include detecting location of the objects within the image, classifying a type of the objects (e.g., as humans, animals, vehicles, buildings, trees, etc.), and/or the like. In an example, object detecting module 110 can receive, from the application 108, an image 112 as input and can provide object data 114, including one or more of object location, object classification, etc. In an example, object detecting module 110 can include a proposal generating module 116 for generating a number of proposals for providing to an object detection process 118 for performing object detection. In an example, proposal generating module 116 can include a condition detecting module 122 for detecting one or more conditions to dynamically determine a number of proposals to provide to the object detecting module 110. In addition, for example, object detection process 118 can include one or more models 122 for performing object detection, where the model(s) 122 may be based on the number of proposals received from proposal generating module 116. In an example, object detection process 118 may also optionally include a refining module 124 for providing one or more refinement layers for refining the object detection based on the model(s) 122, and/or a distilling module 126 for providing an in-place distillation for training one or more of the model(s) 122 for subsequent object detection.

In accordance with aspects described herein, application 108 can provide an image 112 to the object detecting module 110. In this example, proposal generating module 116 can select a number of proposals to provide for performing object detection. For example, condition detecting module 120 can detect a condition, such as complexity of the image, a resource capacity or availability of the device 100 (e.g., of processor, memory 104, etc.), and/or the like, and proposal generating module 116 can determine the number of proposals (and/or which proposals) to provide to the object detection process 118 based on the detected condition. Object detection process 118, in this example, can perform object detection of one or more objects in the image 112 based on the number of proposals, which may include performing one or more refinements via refining module 124. In an example, the object detection process 118 can include Sparse R-CNN, QueryInst, or similar query-based object detection processes, which may output a location and/or classification (and/or likelihood of correct classification or confidence score) for one or more objects in the image. Object detecting module 110, in this example, can provide the object data 114, including object location and/or classification of one or more objects in the image 112, to the application 108. In addition, in an example, distilling module 126 can use the object detection results of one of the models 122 to update another one of the models 122 (e.g., detection results using a model corresponding to a larger number of proposals can be used to update a model corresponding to a smaller number or proposals).

FIG. 2 is a flowchart of an example of a method 200 for performing object detection in an image using a dynamic number of proposals. For example, method 200 can be performed by a device 100 and/or one or more components thereof to facilitate object detection in an image.

In method 200, optionally at action 202, an image can be received as input for object detection. In an example, object detecting module 110, e.g., in conjunction with processor 102, memory 104, operating system 106, object detecting module 110, etc., can receive the image as input for object detection. For example, the image may include an image 112 received from application 108, which may operate on device 100 or a separate device. For example, the image 112 may be an image captured via a camera on the device 100 or separate device, for which object detection, location determination, type classification, etc. is desired by the application 108. As described, for example, application 108 can be a security or surveillance application that monitors entry, exit, or other movement of humans throughout a building, a self-driving vehicle application that identifies objects in a driving path to appropriately operate the vehicle, a photo album application that identifies objects in a photo as people, pets, etc., and/or the like. In any case, the application 108 may provide the image to the object detecting module 110 as input for performing object detection.

In method 200, at action 204, a number of sparse proposals to use in performing the object detection in the image can be set based on a condition. In an example, proposal generating module 116, e.g., in conjunction with processor 102, memory 104, operating system 106, object detecting module 110, etc., can set, based on the condition, the number of sparse proposals to use in performing object detection in the image. For example, proposal generating module 116 can determine the number of proposals and/or can generate the proposals based on the condition. In this regard, proposal generating module 116 can generate or provide a dynamically determined number of proposals to optimize object detection in certain scenarios. For example, the condition can be based on a complexity of the image or a resource capacity or availability at the device 100, as described.

In method 200, optionally at action 206, a complexity of the image can be identified. In an example, condition detecting module 120, e.g., in conjunction with processor 102, memory 104, operating system 106, object detecting module 110, proposal generating module 116, etc., can identify the complexity of the image. In this example, proposal generating module 116 can dynamically set the number of sparse proposals based on the complexity of the image. For example, condition detecting module 120 can determine a measurement of the image complexity based on detecting a number of possible objects in the image, where the complexity can be a value (e.g., an integer or enumeration) that is based on comparing the number of possible objects to one or more thresholds. For example, the image complexity may be "HIGH" where at least a first number of possible objects exist in the image, "MEDIUM" where less than the first number of possible objects but at least a second number of possible objects exist in the image, or "LOW" where less than the second number of possible objects exist in the image. In an example, proposal generating module 116 can provide more sparse proposals for a HIGH complexity image than for a MEDIUM complexity image, and can provide more sparse proposals for a MEDIUM complexity image than a LOW complexity image.

For example, lower complexity images may not benefit as much from a large number of proposals, and thus computing resources can be conserved by using a lower number of proposals for lower complexity images, as described further herein. Determination of other granularities of image complexity are possible, and HIGH, MEDIUM, LOW are just one example. For example, the number of proposals could be computed as a function (e.g., linear function) of the number of possible objects in the image. In any case, for example, proposal generating module 116 can compare the measurement of the complexity of the image to one or more thresholds to determine the number of sparse proposals to provide to the object detection process 118.

In method 200, optionally at action 208, a performance metric can be determined. In an example, condition detecting module 120, e.g., in conjunction with processor 102, memory 104, operating system 106, object detecting module 110, proposal generating module 116, etc., can determine the performance metric of device 100, which may include a resource capacity or availability of resources (e.g., capacity or availability of processor 102, memory 104, etc.), processor or memory performance over a period of time, etc. In this example, proposal generating module 116 can dynamically set the number of sparse proposals based on the performance metric. For example, condition detecting module 120 can determine the performance metric based on running benchmark tests for the device 100, querying the device 100 for resource availability, etc. For example, condition detecting module 120 can detect the condition based on comparing the performance metric to one or more thresholds, as described above with respect to image complexity, to determine the performance metric as an integer or enumeration (e.g., "HIGH," MEDIUM," or "LOW"). In another example, as described, other levels of granularity are possible, such as computing the number of proposals as a function (e.g., linear function) of the performance metric. In any case, proposal generating module 116 can determine the number of sparse proposals based on a condition related to the performance metric, such as resource capacity or availability, etc.

In method 200, at action 210, object detection can be performed in the image based on providing the sparse proposals as input to an object detection process to infer object location and/or classification of one or more objects in the image. In an example, object detecting module 110, e.g., in conjunction with processor 102, memory 104, operating system 106, etc., can perform object detection in the image based on providing the sparse proposals as input to the object detection process (e.g., object detection process 118) to infer object location and/or classification of one or more objects in the image. For example, object detection process 118 can perform the object detection based on one or more models 122 that can be specific to the number of sparse proposals provided by the proposal generating module 116. As described, computing resources required to perform the object detection process can be impacted by the number of sparse proposals, and as such the proposal generating module 116 can effectively reduce or increase the computing resources used to perform the object detection by decreasing or increasing the number of sparse proposals provided, where reducing the number of sparse proposals may be beneficial in certain scenarios, as described above.

In addition, as described above, object detection process 118 may include Sparse R-CNN, QueryInst, or other query-based object detection processes, for example. Moreover, as described above, object detection process 118 may use multiple levels of refinement, via refining module 124, to refine the object location determination and/or classification, as described further herein. For example, object detection can aim to recognize objects in the input image with bounding boxes and category labels (also referred to herein as classifications). Two-stage object detectors such as the R-CNN family can use a large number of predefined anchor boxes to mark the initial locations of candidate objects. To improve the efficiency and inference speed of object detectors, one-stage methods can perform the object detection tasks without using region proposals. As described, query-based methods can be used instead of anchor boxes and region proposals with learned sparse proposals. Sparse R-CNN introduces a fixed sparse set of learned object proposals to classify and localize objects in the image with dynamic heads and generate final predictions directly without post-processing methods like non-maximum suppression.

As a natural extension of object detection with bounding boxes, instance segmentation can use the algorithm to assign every object with a pixel-level mask. Following the frameworks of object detection, Mask R-CNN introduces a mask head to Faster R-CNN to produce instance-level masks. Similarly, one-stage instance segmentation frameworks can be used to balance the inference time and accuracy. QueryInst extends query-based object detection method Sparse R-CNN to instance segmentation task by adding a dynamic mask head and parallel supervision. In an example, proposal generating module 116 can generate a dynamic number of sparse proposals to be used with such object detection processes.

FIG. 3 illustrates an example of model structure 300 of multiple refinement stages QueryInst, to which a dynamic number of sparse proposals can be provided as input. For a given input image, b can represent a bounding box of a given sparse proposal in the number of sparse proposals, and q can represent a feature vector of a given sparse proposal of the number of sparse proposals. In QueryInst, the number of sparse proposals can be input into multiple dynamic convolution (DynConv) modules and/or multi-head self-attenuation (MSA) modules to identify object location and/or classification.

Referring back to FIG. 2, in method 200, at action 212, the object location and/or classification of the one or more objects can be indicated to an application based on an output of the object detection process. In an example, object detecting module 110, e.g., in conjunction with processor 102, memory 104, operating system 106, etc., can indicate, to the application (e.g., application 108) and based on an output of the object detection process 118, the object location within the image and/or classification of the one or more objects. For example, the object location can correspond to a pixel coordinate location of the object, such as a center of the object, a list of pixels corresponding to an outline of the object, etc. In another example, the classification of the object can include an indication of the object type, such as human, vehicle, building, tree, etc., as described.

In method 200, optionally at action 214, one or more models of the multiple models that correspond to a first number of sparse proposals can be trained based on one or more other models of the multiple models that correspond to a second number of sparse proposals. In an example, distilling module 126, e.g., in conjunction with processor 102, memory 104, operating system 106, object detecting module 110, etc., can train the one or more models of the multiple models 122 that correspond to a first number of sparse proposals based on one or more other models of the multiple models 122 that correspond to a second number of sparse proposals. For example, the second number of sparse proposals can be greater than the first number of sparse proposals such that the model with the larger number of sparse proposals is used to train the model with the lesser number. For example, distilling module 126 can train the model associated with the lesser number of sparse proposals with predicted outputs from the model associated with the larger number of sparse proposals, instead of ground truth, which can enable the model associated with the lesser number of sparse proposals to mimic features learned by the model associated with the larger number of sparse proposals, which may provide a desired model output for the model associated with the lesser number of sparse proposals.

Figure 4:
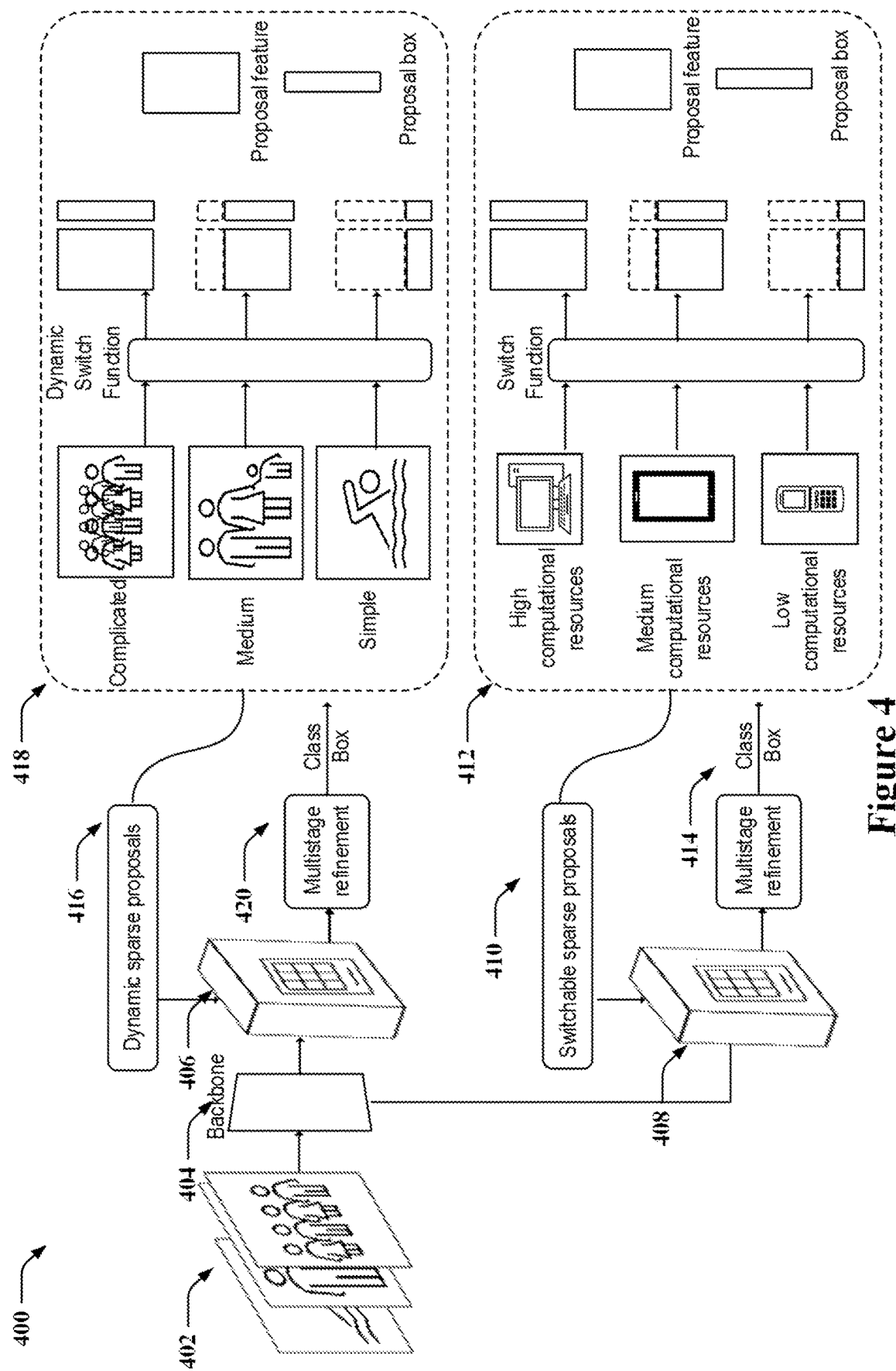
FIG. 4 is a conceptual flow diagram of an example of an object detecting process performed by an object detecting module in accordance with examples described herein.

FIG. 4 illustrates a conceptual flow diagram 400 of an example of an object detecting process performed by an object detecting module 110. For example, given a set of input images 402, the images 402 can be provided to a backbone 404 for feature extraction, such as a feature pyramid network (FPN). In one example, the images 402 and output of the feature extraction can be provided to an object detection process 406/408, such as Sparse R-CNN, QueryInst, etc.

As described above, the aspects described herein can be used as a plug-and-play module to query-based object detection processes. For example, given the feature map xFPN from the backbone 404 (e.g., from FPN), the process of one stage performed by the object detection process 118 can be formalized as Equation 1:

$$(b_t, q_t) \leftarrow S_t(x^{FPN}, b_{t-1}, q_{t-1}), t=1,2,\ldots,6$$

where $q_t \in \mathbb{R}^{N \times d}$ and $b_t \in \mathbb{R}^{N \times 4}$ represent the proposal features and proposal boxes, N and d denote the number and dimension of proposals respectively and N can be set to be 300 in some examples. For the t-th stage $S^t$, refining module 124 can input, into the model, $b_{t-1}$, $q_{t-1}$, and $x^{FPN}$ and can generate the corresponding proposal boxes $b_t$ and proposal features $q_t$ for the next stage to be performed by the object detection process 118. As mentioned, in Sparse R-CNN, given the number of proposals N, both proposal boxes $b_0 \in \mathbb{R}^{N \times 4}$ and proposal features $q_t \in \mathbb{R}^{N \times d}$ can be randomly initialized. Where a 6 stage refinement is used, at the last stage, where t=6, refining module 124 can provide the proposal features $g_t$ and boxes $b_t$ into task networks like multi-layer perceptrons (MLPs) to generate bounding boxes for regression and categories for classification. For example, Sparse R-CNN can apply set prediction loss which produces an optimal bipartite matching between predictions and ground truth, and the loss can be summarized as Equation 2:

$$\mathcal{L} = \text{lambda}_{cls} \cdot \mathcal{L}_{cls} + \lambda_{L1} \cdot \mathcal{L}_{L1} + \lambda_{giou} \cdot \mathcal{L}_{giou}$$

where $\mathcal{L}_{cls}$ is the loss for category classification and $\mathcal{L}_{L1}$, $\mathcal{L}_{giou}$ are losses for bounding boxes regression. $\lambda_{cls}$, $\lambda_{L1}$, and $\lambda_{giou}$ are hyper-parameters to weighted average the losses mentioned above. Typically, the number of proposals N can be fixed, but in accordance with aspects described herein, proposal generating module 116 can specify a dynamic number of sparse proposals based on a detected condition. In one example, query-based object detectors can be jointly trained with different numbers of proposals.

In one example, as described, condition detecting module 120 can detect the condition as related to resource capacity or availability of the device 100. For example, the images 402 and/or an output of the backbone 404 (e.g., FPN) can be provided to object detection process 408, which can be provided with a number of sparse proposals that is based on the resource capacity or availability of the device 100. For example, proposal generating module 116 can use a switch function $\mathcal{F}_{s\,s}(N,\delta)$ to determine the number of proposals $N_s$ where $\delta$ is a configurable parameter with value range (0, 1]. Proposal generating module 116 can use a sampling function $\mathcal{G}_s(\cdot, N_s)$ to select $N_s$ channels from N to form a subset of learned proposals $q_0^s \in \mathbb{R}^{N_s \times d}$ and box $b_0^s \in \mathbb{R}^{N_s \times 4}$. The formulation of $\mathcal{F}_{s\,s}(N,\delta)$ can be Equation 3:

$$N_s = \mathcal{F}_S(N, \delta) = \lceil \delta \theta \rceil \frac{N}{\theta}$$

where $\lceil\ \rceil$ represents the ceiling function and $\theta$ is a fixed positive integer. With different values of $\delta$, $N_s$ have $\theta$ discrete choices given by $$\frac{1}{\theta}N, \frac{2}{\theta}N, \ldots, N.$$

Thus $\theta$ can be named number of configurations. Based on the switch function $\mathcal{F}_{s\,s}$, the proposal features $q_0^s$ and proposal boxes $b_0^s$ can be sliced from the original $g_0$ and $b_0$ using Equation 4:

$$a_0^s = \mathcal{G}(q_0, N_s)$$

$$b_0^s = \mathcal{G}(b_0, N_s)$$

Afterwards each stage of the query-based object detection process 118, e.g., each refinement performed by refining module 124 (e.g., from Equation 1) can be updated as Equation 5:

$$(b_t^s, q_t^s) \leftarrow S_t(x^{FPN}, b_{t-1}^s, q_{t-1}^s), t=1,2,\ldots,6$$

During the training process, $\delta$ can be generated with a uniform distribution $\delta \sim U(0,1)$. For the sampling function $\mathcal{G}$, the first $N_s$ elements out of N elements can be selected. Different from ensemble methods which train multiple models and combine them together, aspects described herein may not require extra parameters or architectures since models with different numbers of proposals can share the same parameters. In particular, for example, models with different numbers of proposals can be jointly optimized during the training process. During the inference process, the model can be executed with different numbers of $N_s$ with different computational costs and slightly different performance. Depending on the computational resource constraints that may be determined by condition detecting module 120, $\delta$ and $N_s$ can accordingly be modified so that the computational cost of the model meets the constraints. In an example, when condition detecting module 120 determines that there are enough computational resources, proposal generating module 116 can use all proposals ($N_s$=N) for inference. When condition detecting module 120 determines less computational resources can be accommodated (e.g., where a laptop reduces the frequency of CPUs due to heat accumulation, proposal generating module 116 can switch the configurations to reduce $N_s$ to some fraction of N (e.g., 0.5N) without the need to reload another model. An example is illustrated in FIG. 4 where switchable sparse proposals 410 can be provided based on resource capacity or availability, and the number or proposal features or boxes can correspond to a level of resource capacity or availability, as shown in Box 412. In addition, refining module 124 can perform multi-stage refinement 414, as described.

The switchable sparse proposals facilitate a single query-based detection model such as Sparse R-CNN to be executed under different numbers of proposals, where the number of proposals can be chosen based on the hardware resources, rather than the content of the image. In another example, as described, condition detecting module 120 can detect the condition as related to image complexity or other content determinations. For example, the images 402 and/or an output of the backbone 404 (e.g., FPN) can be provided to object detection process 406, which can be provided with a number of sparse proposals that is based on the image content or complexity. For example, in determining the number of sparse proposals based on the content of the image, proposal generating module 116 can use the number of (or possible objects, as described above) in the image guidance to generate dynamic numbers of sparse proposals.

For example, during the training process, condition detecting module 120 can estimate the number of objects in the image that is denoted as n. The original variable $\delta$ can be replaced with a deterministic function as Equation 6:

$$\delta(\tilde{n}) = \min\left(\frac{\tilde{n}}{K}, 1\right)$$

where K is a fixed parameter, chosen to be a typical number of objects in a complex image. Thus $\delta$ linearly grows with the predicted number of objects upper bounded at 1. The new dynamic number of proposals $N_d$ is given by Equation 7:

$$N_d = \mathcal{F}_d(N, \delta(\tilde{n})) = \left\lceil\left(\frac{\delta(\tilde{n}) - \alpha}{\beta}\right)\theta\right\rceil\frac{N}{\theta}$$

where $\alpha$ and $\beta$ are hyper-parameters controlling the scale and offset of the produced $N_d$. Again, the dynamic proposal features $q_0^d$ and proposal boxes $b_0^d$ can be sliced from the original $q_0$ and $b_0$ using Equation 8:

$$q_0^d = \mathcal{G}(q_0, N_d)$$

$$b_0^d = \mathcal{G}(b_0, N_d)$$

In an example, condition detecting module 120 can use a lightweight network M to estimate the number of objects $\tilde{n}$ in the current image given the feature maps (e.g., xFPN from the FPN). Although holistic image features may be used to predict the number of possible objects, without explicitly knowing their categories, this can be informative enough to give a reasonable prediction. Mean square error (MSE)

between ñ and ground truth number of objects $n_g$ can be calculated as the loss $\mathcal{L}_{est}$ to optimize the network M, as Equation 9:

$$\tilde{n} = M(x^{FPN})$$

$$\mathcal{L}_{est} = \mathcal{L}_{MSE}(\tilde{n}, n_g)$$

The same sampling function $\mathcal{G}$, as described above with respect to switchable sparse proposals, can be used in Equation 8. In the training process, ñ can be set to be the current estimation of numbers of objects, $\alpha$ and $\beta$ are set to 0 and 1, respectively. During inference, given an input image, condition detecting module 120 can detect the number of objects n in the image, and proposal generating module 116 can use $\mathcal{F}_d$ to determine the number of necessary proposals for object detection. For images with fewer objects, where n is small, proposal generating module 116 can use fewer proposals for fast inference. For those with more objects and complex structures, $\mathcal{F}_d$ can generate a large $N_d$ to provide better coverage of proposals on the target objects. In one example, the model can be executed on devices with different computational resources, where proposal generating module 116 can also adjust the parameters $\alpha$ and $\beta$ in $\mathcal{F}_d$ to tune the overall computational cost while still dynamically selecting the number of proposals for different images. An example is illustrated in FIG. 4 where dynamic sparse proposals 416 can be provided based on image complexity, and the number or proposal features or boxes can correspond to a level of image complexity, as shown in Box 418. In addition, refining module 124 can perform multi-stage refinement 420, as described.

With the switchable or dynamic sparse proposals, a single model can embed a sequence of model variants characterized by different numbers of proposals. During the training process, the full model, e.g., the model variant with N proposals, can naturally learn a better feature representation with multi-stage refinement performed by refining module 124. As described above (e.g., with reference to action 214 of method 200 in FIG. 2), the knowledge of the full model can be borrowed to improve the model variants (e.g., various models 122) with fewer proposals. In this example, distilling module 126 can perform in-place distillation. Knowledge distilling can relate to knowledge from a large model being transferred to a small model. In most of the two-step knowledge distilling methods, a large model is trained first and then its learned knowledge is transferred to a small model by training with the predicted outputs of the large model instead of the ground truth. In one possible example, distilling module 126 can use the full model with N proposals as the teacher model and those with fewer proposals as the student models.

For example, during the training process, in addition to the forward procedure in Equation 5 for an arbitrary student model, a forward procedure for the teacher model as in Equation 1 can be performed. Distillation can be applied to both switchable and dynamic sparse proposals. Taking dynamic sparse proposal as an example, at each stage t, distilling module 126 can calculate the Region of Interest (ROI) features $f_t$ and $f_t^d$ given the input ROI boxes $b_t$ and $b_t^d$. The distillation loss at stage t is a weight sum of the mean square errors between $f_t$, $f_t^d$ and $q_t$, $q_t^d$. The final distillation loss $\mathcal{L}_{dst}$ can sum over different stages and is formulated as Equation 10:

$$f_t, f_t^d = ROIPool(x^{FPN}, b_t), ROIPool(x^{FPN}, b_t^d)$$

-continued $$\mathcal{L}_{dst} = \sum_t \left( c_1 \mathcal{L}_{MSE}^t(\mathcal{G}(f_t, N_d), f_t^d) + c_2 \mathcal{L}_{MSE}^t(\mathcal{G}(q_t, N_d), q_t^d) \right)$$

where $c_1$ and $c_2$ are two coefficients. In an example, distilling module 126 can apply the distillation loss on the feature maps of each object proposal between the teacher and student models. In an example, no distillation loss is applied to the output class predictions and bounding box predictions mainly because powerful detection models may produce a considerable number of incorrect predictions on challenging cases. Accordingly, distilling module 126 can make the student model to mimic features learned by the teacher, rather than the outputs, as described above.

Figure 5:
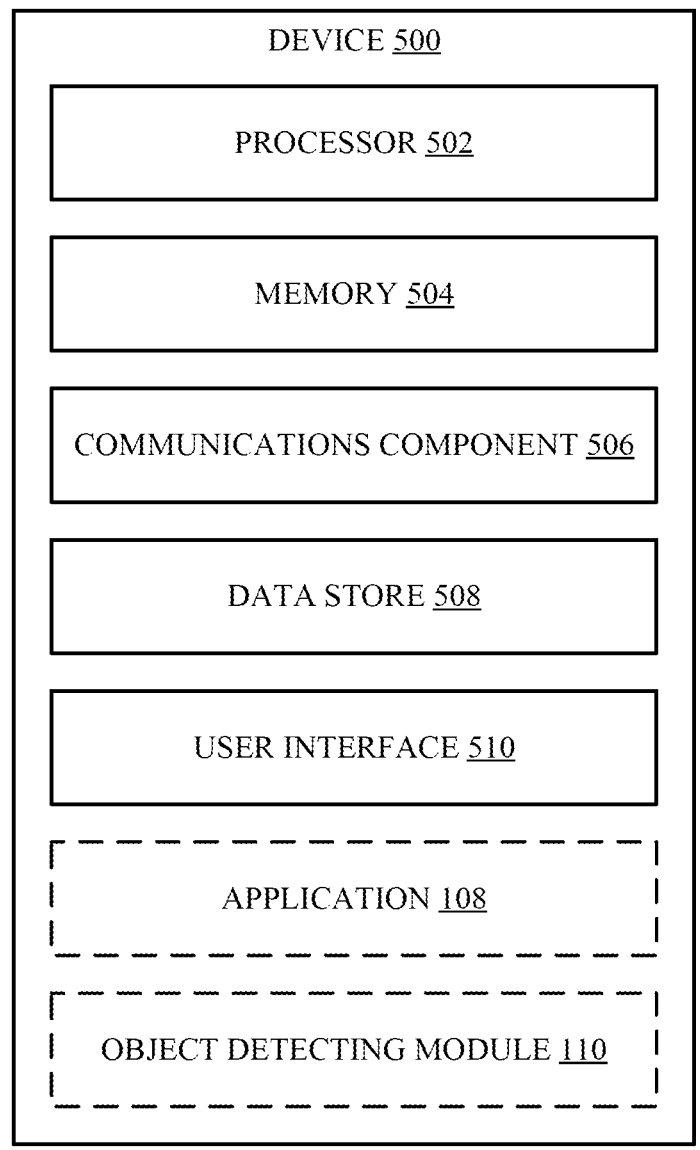
FIG. 5 is a schematic diagram of an example of a device for performing functions described herein.

FIG. 5 illustrates an example of device 500, similar to or the same as device 100 (FIG. 1), including additional optional component details as those shown in FIG. 1. In one implementation, device 500 may include processor 502, which may be similar to processor 102 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 104 such as for storing local versions of applications being executed by processor 502, such as application 108, object detecting module 110, related instructions, parameters, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc., utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with implementations described herein. For example, data store 508 may be or may include a data repository for applications and/or related parameters (e.g., application 108, object detecting module 110, etc.) not currently being executed by processor 502. In addition, data store 508 may be a data repository for application 108, object detecting module 110, and/or one or more other components of the device 500.

Device 500 may include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include an application 108, which may request object detection for one or more images, and/or an object detecting module 110, which may perform object detection for the application 108 on the one or more images, and may indicate an object location, classification, etc. for one or more objects detected in the image.

In summary, an aspect relates to a training strategy to facilitate a single query-based model to adaptively switch the number of proposals according to the hardware constraint. Empirical studies show described model achieves similar performance as individually-trained models under the same number of proposals. Specifically, such aspects relate to a design of switchable sparse proposals. In an example implementation, a network structure of switchable proposals is the same as the original query-based model Sparse R-CNN or QueryInst except that the proposals can be selected from a list of predefined choices. Such aspects can be deployed once and used in different devices with different computational constraints.

Further, alternative or additional aspects include dynamically choosing the number of proposals based on the complexity of the input image, which effectively reduces computational costs. Such aspects include a framework which uses a variable number of proposals for object detection and instance segmentation. An example model automatically selects different numbers of proposals based on the complexity of the input image, improving the overall efficiency of the model while still achieving similar accuracy as original static models. Specifically, such aspects relate to a design of dynamic sparse proposals, including, in one example, adding a module to estimate a number of objects in the network. The estimated number of objects is used in a function to dynamically choose a number of proposals. The computation of the network is related to the number of objects in the input image. The model is more efficient than original query-based methods as it can save computation on easy or medium level images. Further, such aspects include techniques to train a single query-based object detection model to be adaptive to different computational constraints by switching the number of proposals.

Moreover, alternative or additional aspects relate to in-place distillation. In an example, the described techniques provide an in-place distillation training strategy to improve the model variants with fewer proposals by transferring knowledge from the model with most proposals. In other words, the described aspects can use the knowledge embedded in the model with most proposals to improve model variants with less proposals. In some implementations, distillation loss can be used jointly with the other training losses during training; but may not be used during inference.

Thus, the described aspects replace the fixed number of proposals with a dynamic size in the current query-based object detection methods. Instead of using fixed sparse proposals, the model of the described techniques can choose different numbers of proposals based on the content of input images or the current computational resources. Equipped with switchable sparse proposals, a single query-based model is able to switch into different numbers of proposals while achieving similar performance as individual models.

Equipped with dynamic sparse proposals, an example model can adaptively choose different subsets of proposals according to the estimated complexity of the input image, reducing the average inference time. The described aspects may be efficient for both model development as well as deployment on object detection. Accordingly, the described aspects can define a plug-and-play module that can be easily integrated with most of the current query-based methods for object detection and instance segmentation. For example, when applying the described aspects on QueryInst, the inference speed increases by up to 80% with similar or even better precision. Therefore, the present aspects provide an improvement over current query-based object detection methods.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for detecting objects in an image on a device, comprising:
setting, by a processor and based on a condition, a number of sparse proposals to use in performing object detection in the image, including setting the number of sparse proposals to be a first number of sparse proposals when the condition is met or setting the number of sparse proposals to be a second number of sparse proposals when the condition is not met, wherein the first number is different than the second number;
performing, by the processor, object detection in the image based on providing the sparse proposals as input to an object detection process to infer object location and classification of one or more objects in the image; and
indicating, by the processor to an application, the object location and classification of the one or more objects based on an output of the object detection process.

2. The method of claim 1, wherein the condition corresponds to a measurement of a complexity of the image, and wherein setting the number of sparse proposals is based on comparing the measurement of the complexity of the image to one or more thresholds.

3. The method of claim 2, further comprising estimating a number of objects in the image, wherein determining the complexity of the image is based at least in part on the number of objects identified in the image.

4. The method of claim 1, wherein the condition corresponds to a performance metric of the device, and wherein setting the number of sparse proposals is based on comparing the performance metric to one or more thresholds.

5. The method of claim 4, wherein the performance metric corresponds to a capacity of a resource or an available amount of the resource at the device.

6. The method of claim 5, wherein the resource is one or more of a processing resource or a memory resource of the device.

7. The method of claim 1, wherein the object detection process includes multiple models each corresponding to a different number of sparse proposals, and wherein the object detection process performs object detection based on selecting a model corresponding to the number of sparse proposals.

8. The method of claim 7, further comprising training one or more models of the multiple models that correspond to a first number of sparse proposals based on one or more other models of the multiple models that correspond to a second number of sparse proposals, wherein the second number is greater than the first number.

9. The method of claim 1, wherein the object detection process uses a Sparse R-CNN or Query Inst.

10. An apparatus for performing object detection in an image, the apparatus comprising a processor and a non-transitory memory with instructions thereon, wherein the instructions upon execution by the processor, cause the processor to:
set, by the processor and based on a condition, a number of sparse proposals to use in performing object detection in the image, including setting the number of sparse proposals to be a first number of sparse proposals when the condition is met or setting the number of sparse proposals to be a second number of sparse proposals when the condition is not met, wherein the first number is different than the second number;
perform object detection in the image based on providing the sparse proposals as input to an object detection process to infer object location and classification of one or more objects in the image; and
indicate, to an application, the object location and classification of the one or more objects based on an output of the object detection process.

11. The apparatus of claim 10, wherein the condition corresponds to a measurement of a complexity of the image, and wherein the instructions upon execution by the processor, cause the processor to set the number of sparse proposals based on comparing the measurement of the complexity of the image to one or more thresholds.

12. The apparatus of claim 11, the instructions upon execution by the processor, further cause the processor to estimate a number of objects in the image, wherein the instructions upon execution by the processor, cause the processor to determine the complexity of the image based at least in part on the number of objects identified in the image.

13. The apparatus of claim 10, wherein the condition corresponds to a performance metric of the apparatus, and wherein the instructions upon execution by the processor, cause the processor to set the number of sparse proposals based on comparing the performance metric to one or more thresholds.

14. The apparatus of claim 13, wherein the performance metric corresponds to a capacity of a resource or an available amount of the resource at the apparatus.

15. The apparatus of claim 14, wherein the resource is one or more of a processing resource or a memory resource of the apparatus.

16. The apparatus of claim 10, wherein the object detection process includes multiple models each corresponding to a different number of sparse proposals, and wherein the object detection process performs object detection based on selecting a model corresponding to the number of sparse proposals.

17. The apparatus of claim 16, wherein the instructions upon execution by the processor, further cause the processor to train one or more models of the multiple models that correspond to a first number of sparse proposals based on one or more other models of the multiple models that correspond to a second number of sparse proposals, wherein the second number is greater than the first number.

18. The apparatus of claim 10, wherein the object detection process uses a Sparse R-CNN or QueryInst.

19. A non-transitory computer-readable recording medium storing one or more outputs of object detection in an image which is generated by a method performed by an object detecting module, wherein the method comprises:
setting, by a processor and based on a condition, a number of sparse proposals to use in performing object detection in the image, including setting the number of sparse proposals to be a first number of sparse proposals when the condition is met or setting the number of sparse proposals to be a second number of sparse proposals when the condition is not met, wherein the first number is different than the second number;
performing object detection in the image based on providing the sparse proposals as input to an object detection process to infer object location and classification of one or more objects in the image; and indicating, to an application, the object location and classification of the one or more objects based on an output of the object detection process.

20. The non-transitory computer-readable medium of claim 19, wherein the condition corresponds to a measurement of a complexity of the image, and wherein setting the number of sparse proposals is based on comparing the measurement of the complexity of the image to one or more thresholds.

* * * * *